Feb. 6, 1962  E. W. TURNQUIST  3,020,022
CABLE WINCH
Filed Aug. 27, 1958  5 Sheets-Sheet 1

INVENTOR
EDWIN W. TURNQUIST
BY
ATTORNEY

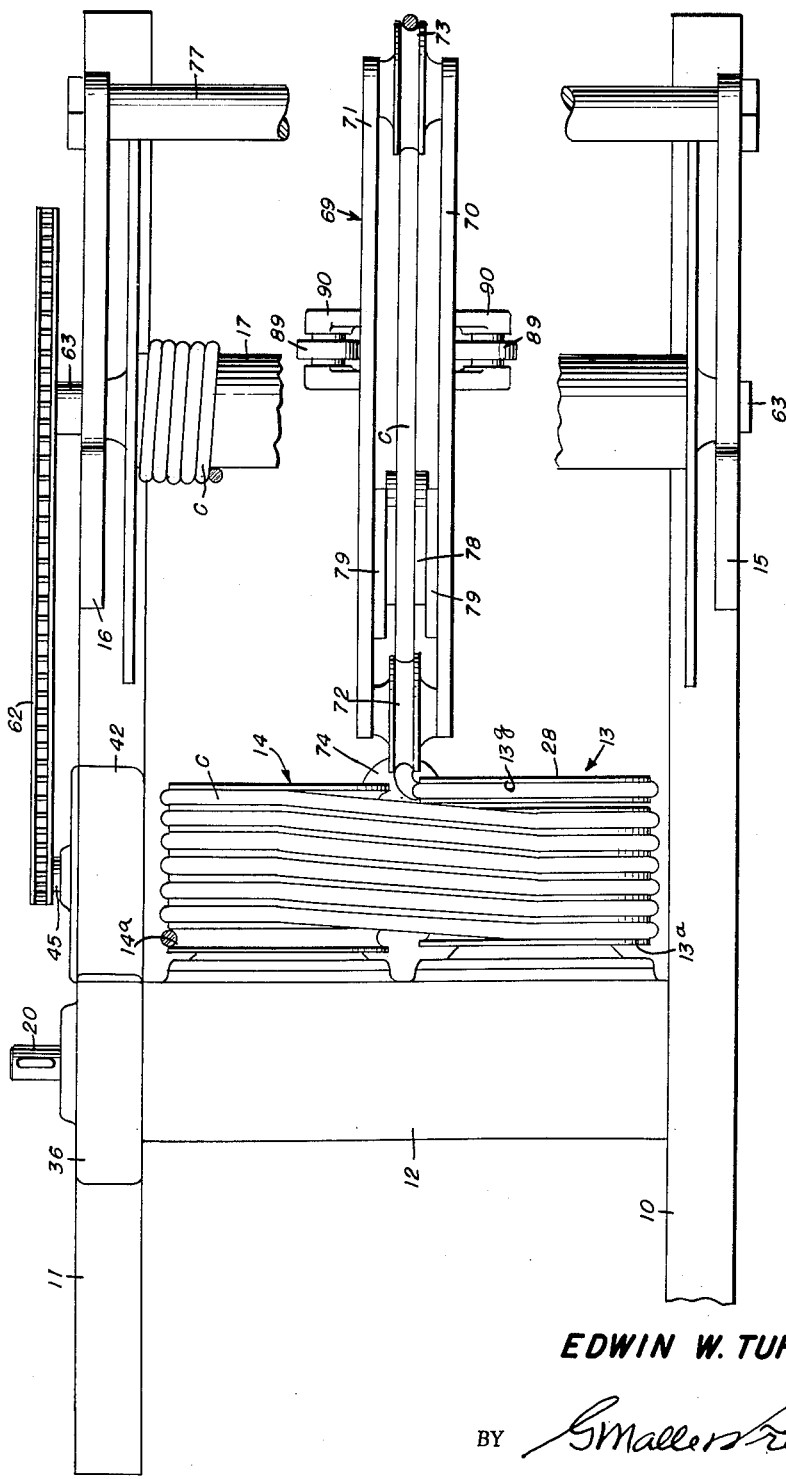

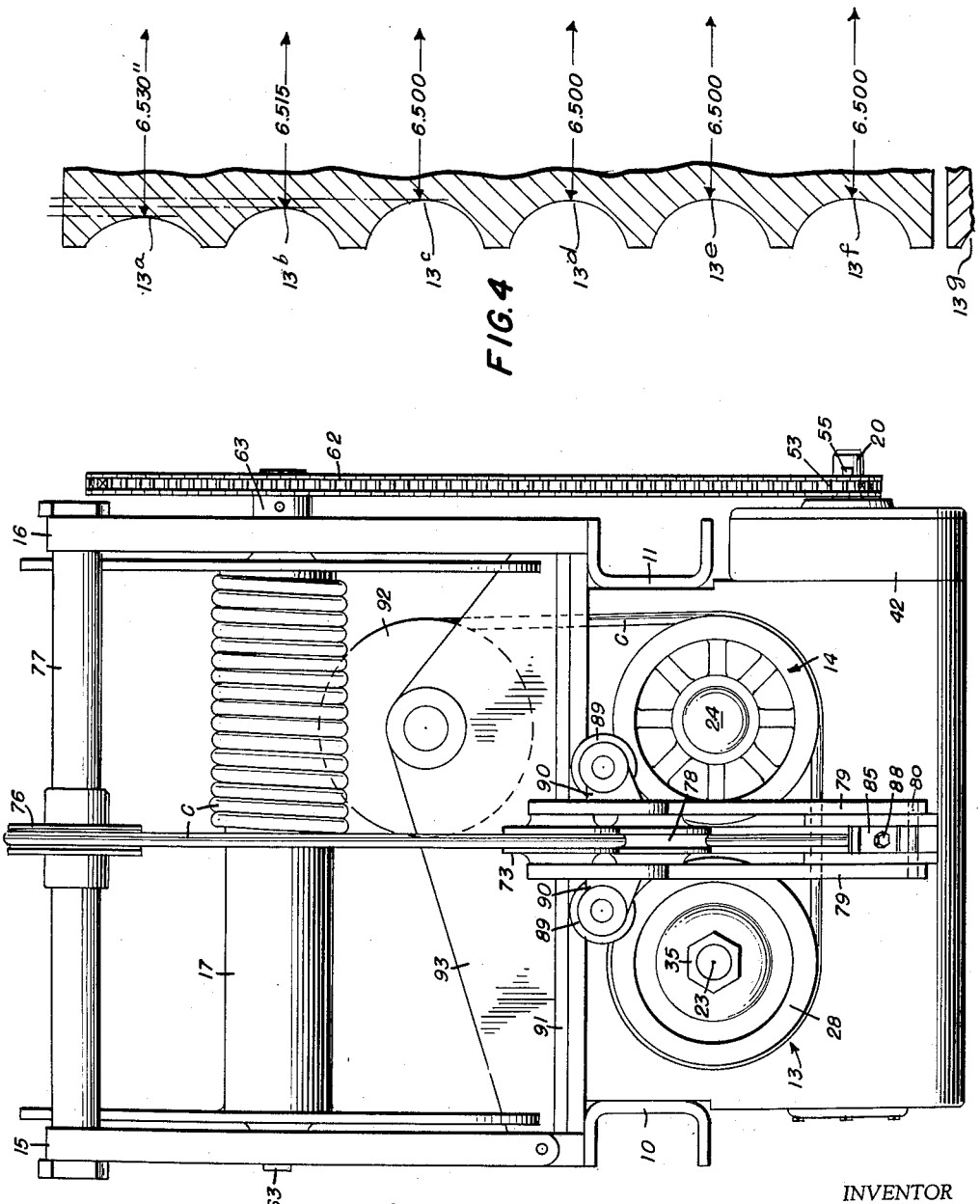

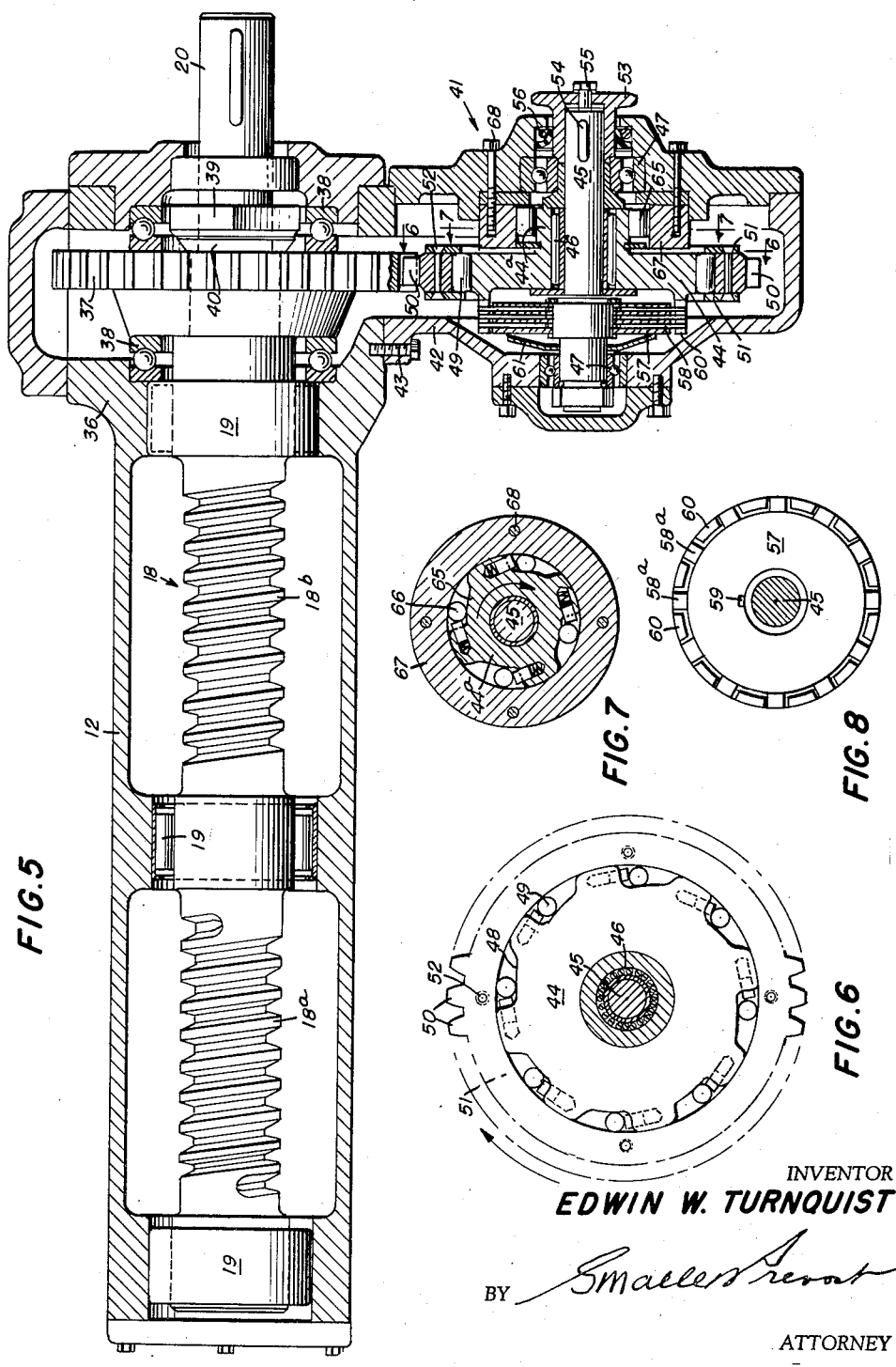

United States Patent Office 3,020,022
Patented Feb. 6, 1962

3,020,022
CABLE WINCH
Edwin W. Turnquist, Tulsa, Okla., assignor to Braden Winch Company, Broken Arrow, Okla.
Filed Aug. 27, 1958, Ser. No. 757,546
8 Claims. (Cl. 254—175.7)

This invention relates to cable winches and consists more particularly in new and useful improvements in a wire rope cable winch of the type that utilizes a cable storage drum separate from the power or pulling drum or drums.

Previous cable winches of this general type utilize a V-type groove in the power or pulling drums. The cable will wedge down into this groove and it is from this wedging action alone that the winch derives its ability to pull heavy loads.

Under heavily loaded conditions, the wire rope cable will stretch and as the cable moves from the initial V groove where it is heavily loaded, in a stretched condition and wedged deeply into the groove, to successive grooves where lighter loads are present and where there is less stretching in the cable and the cable is not wedged so deeply into the groove, the cable will creep or move along the periphery of the pulling drums. This creeping will cause an excessive amount of wear both to the cable and to the winch drums.

Furthermore, the use of the V-type groove makes it impractical to drive both power drums simultaneously. The movement of the cable with respect to the drum grooves causes an interference to exist between the two drums when both are driven, resulting in extreme inefficiency and ineffectiveness of one of the drums. When V grooves are used one drum should be an idler, its only purpose being to transfer the cable from one groove to another on the driven drum.

Another bad feature of the V grooved power drums is the fact that when the winch is reversed the wedging action of the cable in the groove will cause the power drum to pull the cable from the storage drum, and, unless the cable is pulled from the power drum at the exact speed of this drum, the cable will ensnarl itself about the drum making the winch inoperative.

Still another bad feature is that the wedging action of the cable in the V grooves will distort the cable and shorten its life to a considerable degree.

An object of this invention is to provide a cable winch of the type having a cable storage drum separate from the pulling or power drums wherein the power or pulling drums are provided with multiple radially grooved peripheries, the said groove to be machined to fit the cable, thereby having no tendency to flatten or pinch this cable. The tread diameter of certain successive grooves being progressively increased toward the entering groove to compensate for the stretching of the cable under extreme loads and thereby maintaining the required drum cable friction which would otherwise be lost due to the stretching of the cable. In other words, by progressively increasing the tread diameter of the grooves in the vicinity of the entrance end of the power drums a progressively increasing gripping action is maintained so that the stretching of the cable is compensated for and the required friction maintained.

Another object of the invention is to provide a cable winch of the type consisting of power drums and a storage drum wherein both power drums can be driven with the load equally distributed between these two drums and their driving components.

A further object of the invention is to provide a cable winch of the type consisting of driven power drums, a storage drum, level winding means on the storage drum and means for driving both the power drums and the storage drum to thereby exert a continuous pull on the cable as it leaves the power drums providing all the safety available in winches of the type wherein the drum and drive gear are keyed to the same shaft and yet providing greater flexibility in operation than winches of the type having free spooling drums.

Still another object of this invention is to provide a cable winch wherein the cable will remain on the storage drum while the power drums are running in reverse rotation until the cable is pulled therefrom by hand or other means, and further, enabling the cable to be pulled from the storage drum at any speed up to the speed of the reversing power drums.

A still further object of the invention is to provide a cable winch of a type consisting of grooved power drums and a storage drum wherein the exit groove of one of the power drums is located on an independent but coaxial overrunning sheave that will turn with the power drums in forward rotation but may remain stationary when the power drums are reversing and the cable is not being pulled from the winch, thereby preventing the chipping of the grooved boundaries by the cable when it encircles this groove more than 180°.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views:

FIGURE 2 is a top plan view of the winch, again with certain parts broken away to better illustrate the structure;

FIGURE 3 is an end view of the winch;

FIGURE 4 is an enlarged fragmentary sectional view illustrating the groove arrangement in one of the power drums;

FIGURE 5 is an enlarged horizontal sectional view through the center line of the worm and storage drum driving mechanism;

FIGURE 6 is a vertical sectional view taken on line 6—6 of FIGURE 5, illustrating the larger of two overrunning clutches in the storage drum driving mechanism;

FIGURE 7 is a similar view taken on line 7—7 of FIGURE 5, illustrating the smaller of the two overrunning clutches of the storage drum driving mechanism;

FIGURE 8 is a sectional detail of the friction disc drive connection to the overrunning clutches.

Figure 1:
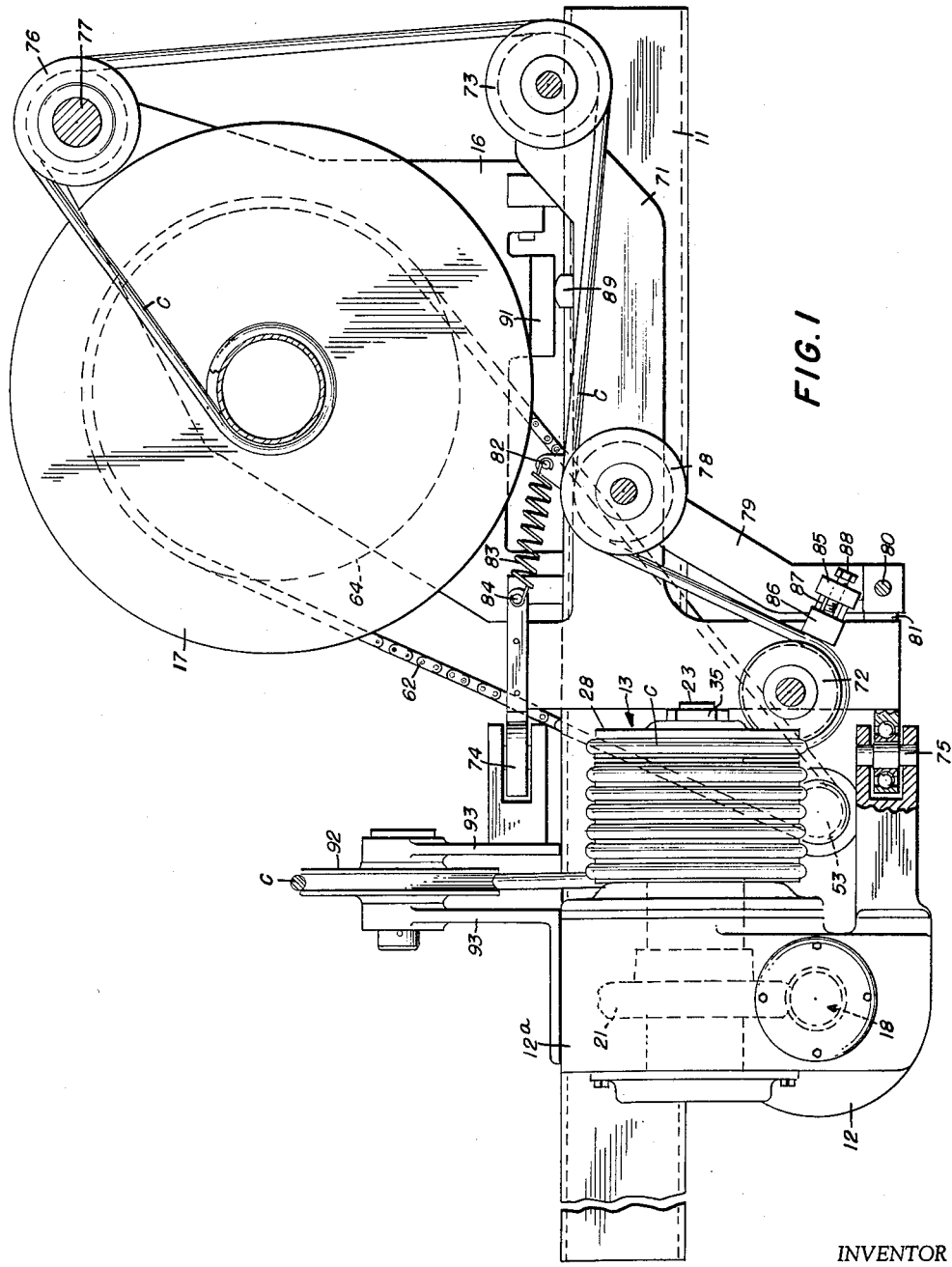
FIGURE 1 is a side elevational view of the winch with certain portions omitted for clarity.

In the drawings, referring first to FIGURES 1 and 2, a longitudinal frame consisting of spaced parallel members 10 and 11, supports the various components of the winch. At one end, this frame supports the housing 12 for the worm drive of the power drums 13 and 14, while the other end supports a pair of vertically disposed brackets 15 and 16 for mounting the storage drum 17, as will later appear.

Figure 9:
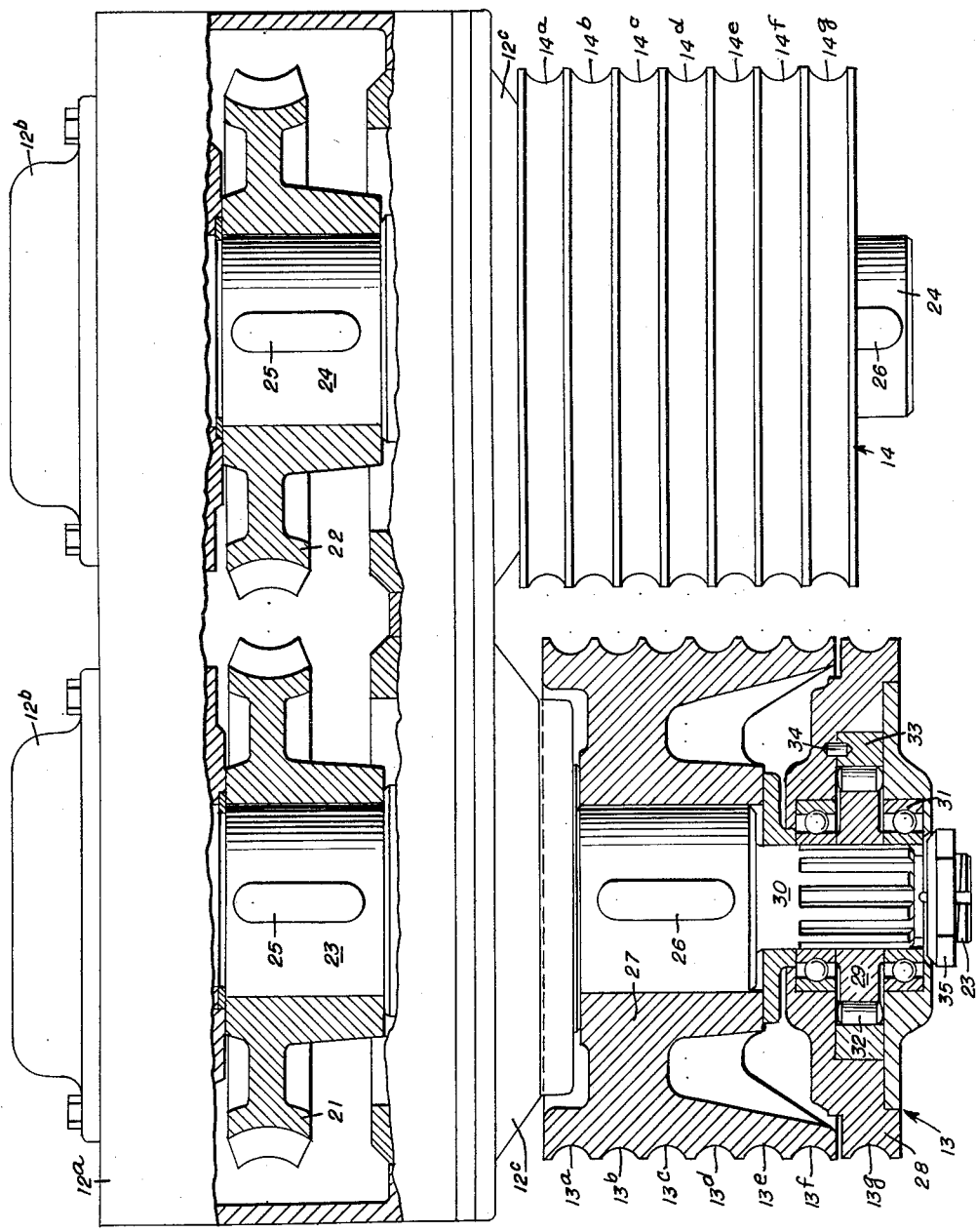
FIGURE 9 is a top plan view of the worm gear housing and power drums, partially in section for purposes of illustration.

The worm drive mechanism for the power drums 13 and 14 will best be understood by reference to FIGURES 5 and 9, the relationship of the elements in these two figures being shown in FIGURE 1. Referring first to FIGURE 5, the housing 12 rotatably supports a worm shaft generally represented by the numeral 18 which is mounted in suitable bearings 19 arranged at longitudinally spaced intervals in the housing with its power input end 20 projecting from one end of the housing. The worm shaft 18 is provided with two separate but similar screw threaded or worm areas 18a and 18b, arranged at longitudinally spaced intervals and adapted to coact with worm gears 21 and 22 respectively. The worm gears are mounted in an extension 12a of the housing 12 on shafts 23 and 24 respectively, mounted in suitable bearings, on transversely spaced parallel axes, perpendicular to the axis of the worm screw 18, so that the gear teeth of gear 21 mesh with the screw threaded area 18a of the worm shaft and the teeth of worm gear 22 mesh with the screw threaded area 18b of the worm shaft. The worm gears 21 and 22 are keyed to their shafts by suitable keys 25 so that upon rotation of the worm shaft 18, the worm gears 21 and 22 cause the rotation of their respective shafts.

The opposite ends of the shafts 23 and 24 project from the housing extension 12a and carry the transversely spaced power drum assemblies 13 and 14 which are keyed to their respective shafts as at 26. Suitable closures 12b and 12c seal the housing extension 12a adjacent the power drum shafts 23 and 24.

As will be seen from FIGURE 9, the power drum 14 on shaft 24 is formed of a unitary cylinder having a series of peripheral grooves 14a to 14g. In the form of the invention here shown, the grooves are seven in number, but it will be understood that there may be more or less, depending upon the nature and requirements of the winch involved.

The power drum 13 is a composite structure consisting of a main drum portion 27 which is keyed to the shaft 23 as at 26 and an overrunning sheave portion 28 which is coaxial with the main portion 27 but separately supported on the end of the shaft 23. This overrunning sheave 28 is carried by a central cam member 29 which is splined as at 30 to the end of the shaft 23 with suitable bearings 31 interposed between the sheave and the shaft. The periphery of the cam member 29 is provided with a series of annularly spaced inclined recesses which, when the shaft 23 and cam member 29 turn in one direction, cause a wedging action of a series of rollers 32 interposed between the cam recesses and an outer race 33 fixed to the sheave 28 as at 34. When the shaft 23 and cam 29 are turned in the reverse direction, the wedging contact is released and the cam can turn freely within the sheave 28. This structure is substantially the same as that shown in FIGURES 6 and 7 which illustrate similar overrunning clutch mechanisms embodied in different locations in this construction, and its operation will be described more in detail at a later point. The sheave 28 is held in place on the shaft 23 by a lock nut 35.

As seen in FIGURE 9, the composite drum 13 is slightly forwardly offset with respect to the unitary drum 14, placing the overruning sheave portion 28 slightly forward of the adjacent extremity of the drum 14. The drum 13 is provided with a corresponding number of peripheral grooves 13a–13g, the grooves 13a–13f being formed in the periphery of the main portion 27 of the drum while the groove 13g is formed in the periphery of the overrunning sheave 28.

As shown in FIGURE 2, when the cable C is wound on the drums 13 and 14, it enters in groove 14a of drum 14 from whence it passes to groove 13a of drum 13 and so on until it leaves the drums by way of groove 13g in the periphery of the overrunning sheave 28. If there is no tension on the cable C or an inadequate tension, the grooved drums will simply slide within the cable convolutions. Therefore, in order to exert a pull on the cable, there must be friction between the cable and power drums. Up to approximately 4,000 pounds, depending upon the type of cable used, there will be no material stretch on the cable but beyond this, the cable will stretch. Under these conditions with a stretched cable, when the cable enters the drum grooves 14a and 13a, if all of the grooves were of a common diameter, there would be a reduced friction which would result in the power drums simply rotating idly within the cable coils. In order to compensate for this stretching, I have found that by increasing the tread diameter of the grooves 14a and 14b in drum 14 and likewise grooves 13a and 13b in drum 13, to a slight degree, this compensates for the stretching of the cable and provides the required friction. Thus, as seen in FIGURE 4, the tread diameter of groove 13a is slightly larger than the tread diameter of groove 13b which in turn is slightly larger than the tread diameter of groove 13c. The grooves 13c–13g are of identical tread diameters. The tread diameter of groove 14a of drum 14 is identical with groove 13a of drum 13 and all of the remaining grooves bear a comparable relationship. The dimensions shown in FIGURE 4 of the drawing are simply illustrative and there is no intention to limit the structure in this respect.

In explanation of the purpose of the overrunning sheave 28 of drum assembly 13, it is to be noted that on the main grooves of drum 13, the cable wraps 180° while on groove 13g on the sheave 28, it wraps 270° or ¾ around the sheave. During the pulling or winding operation, the overrunning sheave 28 serves no purpose other than if it were an integral part of the main drum 27 but when the winch is reversed with no tension on the cable, the extent of its engagement with groove 13g, if the latter were integral with the main portion of the drum 27, would cause a chipping of the groove boundaries as the cable leaves the groove. However, with the illustrated arrangement, where the overrunning sheave 28 can remain stationary on reverse rotation of shaft 23, through the action of the cam clutch mechanism 29—33, relative movement of the sheave with respect to the cable is prevented. In other words, during the winding operation the cam 29 causes a wedging action through the rollers 32, with the result that the sheave 28 turns with the main drum portion 27. However, on the reverse action the camming is released and the sheave 28 can remain stationary while the main portion 27 of the drum is rotating in reverse direction.

The storage drum 17 is driven by the same worm drive assembly which actuates the power drums and the mechanism for accomplishing this function will best be understood by reference to FIGURES 5–8. Adjacent the drive end 20 of the worm shaft 18, the housing 12 is extended as at 36 to accommodate a spur gear 37 which is keyed to the worm shaft 18 so as to rotate therewith. Suitable thrust bearings 38 are arranged in the housing extension 36 on either side of the spur gear 37 and a nut 39 and lock washer 40 secure the spur gear 37 in place on the shaft. An overrunning clutch assembly 41 is arranged in a clutch housing 42 which is bolted to one side of the housing extension 36 by suitable bolts 43.

This clutch assembly 41 comprises a cam member 44 mounted for rotation on a short shaft 45 through the medium of a roller bearing arrangement 46, the shaft 45 being supported in the clutch housing 42 by suitable bearings 47. As best seen in FIGURE 6, the cam member 44 is provided with a series of peripheral notches 48 which are inclined in a clockwise direction as viewed in FIGURE 6 and adapted to receive a corresponding series of rollers 49 which are interposed between the inclined surfaces of respective recesses 48 and the inner periphery of a ring gear 50 within which the cam member 49 is adapted to rotate, the ring gear 50 being arranged to mesh with the teeth of the spur gear 37. Opposite sides of the ring gear 50 are provided with annular plates 51 riveted to the ring gear as at 52, said plates acting as retainers for maintaining the ring gear in position around the periphery of the cam member 44. Thus, when the worm shaft 18 and spur gear 37 are rotated in counterclockwise direction as viewed from the right in FIGURE 5, the ring gear 50 is caused to rotate in clockwise direction as shown by the arrow in FIGURE 6. The rotation of the ring gear 50 in this direction causes the latter to lock with the cam member 44 through the wedging engagement of the rollers 49 in their respective inclined recesses 48, thereby correspondingly rotating the cam member 44. Upon the reverse rotation of the spur gear 37 and ring gear 50, in the direction opposite that of the arrow in FIGURE 6, the ring gear slides idly over the rollers 49 which are shifted to the deep ends of the recesses 48, thereby permitting the cam member 44 to remain stationary.

The outer end of the short shaft 45 carries a sprocket 53 which is keyed to the shaft as at 54 and provided with an adjusting cap screw 55, a mechanical grease seal of any suitable type being provided at 56. Adjacent its opposite end, the shaft 45 carries a friction assembly comprising a series of coaxial steel discs and friction elements 57 and 58 respectively, alternately arranged for face-to-face engagement. The steel discs 57 are keyed to the shaft 45 as at 59 while the friction elements 58 extend radially a slight distance beyond the boundaries of the discs 57, where they are each provided with a series of radially projecting peripheral teeth 58a. These teeth 58a are spaced to fit freely between a corresponding series of perpendicularly projecting teeth 60 formed on the adjacent face of the cam member 44 and extending around the cam member in an annular ring as best seen in FIGURE 8. A leaf spring 61 is interposed between the inner surface of the clutch housing 42 and the outermost steel disc 57 for normally maintaining frictional engagement between the discs 57 and the friction elements 58.

Thus, upon rotation of the cam member 44 when operatively engaged by the ring gear 50, the friction elements 58 are caused to rotate therewith through engagement of the teeth 58a and 60, and as these elements 58 are maintained in frictional engagement with the steel discs 57 through spring 61, the entire assembly is caused to rotate and with it the shaft 45, which correspondingly rotates the sprocket 53.

As shown in FIGURES 2 and 3, the sprocket 53 on shaft 45 carries a sprocket chain 62 for driving the storage drum 17. This drum is supported at either end by trunnions 63 rotatably mounted in the frame members 15—16 and the sprocket chain 62 passes over the sprocket 53 on shaft 45 and an enlarged sprocket wheel 64 (FIG. 1) fixed to the storage drum shaft or trunnions. Thus, simultaneously with the operation of the power drums 13 and 14 by the worm shaft 18 and related mechanisms, the storage drum 17 is caused to rotate by means of the overrunning clutch assembly 41. Due to the slip action in the disc clutch assembly 57—58, the shaft 45 can rotate slower than the ring gear 50, depending upon the amount of resistance applied to the sprocket 53.

The construction and operation thus far described have been primarily concerned with the hoisting or pulling phase of the operation of the winch. However, it is important to provide brake means for controlling the cable automatically as it unwinds from the storage drum. In the present invention, this is accomplished by incorporating in the overriding clutch assembly 41, a second overrunning clutch operating in conjunction with the cam member 44 which has just been described. As seen in FIGURE 5, the cam member 44 is provided with a coaxial cam extension 44a similarly provided in its periphery with a series of annularly spaced recesses 65 (FIG. 7) which are also inclined in clockwise direction as viewed in FIGURE 7 and contain a corresponding series of spring pressed rollers 66. The cam extension 44a is rotatable within an outer race 67 fixedly mounted within the housing 42 by bolts 68. It will be seen that this second over-running clutch or braking mechanism is generally similar to that shown in FIGURE 6, except that the outer race 67 is stationary as distinguished from the rotatable ring gear 50 in the main overrunning clutch 44. Thus, this second clutch permits the free rotation of the cam 44—44a in the direction of the arrow shown in FIGURE 7 but prevents rotation of the cam in the opposite direction. In other words, this clutch assembly allows the cam to rotate with the input shaft during forward or hoisting operations but forces the cam 44a to remain stationary during the reverse or lowering operation.

To facilitate the proper winding of the cable C on the storage drum 17 as it is fed from the power drums 13 and 14, a level winding device 69 is provided. This comprises a pair of laterally spaced arms or brackets 70 and 71, carrying therebetween a pair of sheaves 72 and 73. The brackets are joined at one end where they are pivotally supported by vertically spaced pivotal bearings 74 and 75 on the main housing of the winch, thereby enabling the brackets 70 and 71 to swing in an arc parallel with the axis of bearings 74 and 75. A third sheave 76 is rotatably and slidably mounted on a transverse shaft 77 extending between the storage drum supporting brackets 15 and 16. A tension sheave 78 is rotatably supported at the upper end of a pair of spaced brackets 79, hinged at their lower ends for vertical movement on a horizontal pivot pin 80 (FIG. 1) which passes through an extension 81 fixed to the pivoted ends of the level winding brackets 70, 71. The upper ends of the brackets 79 carry a cross-pin 82 by means of which a coil spring or the like 83 is interposed between the brackets 79 and an anchoring member 84 fixed to the hinged ends of the brackets 70, 71.

Thus, as the cable C leaves the groove 13g of the overrunning sheave 28 on power drum assembly 13, it passes under the first sheave 72 supported in the level winding brackets 70, 71, up and over the tension sheave 78, under the outermost sheave 73 of the level winding brackets, up and over the slidable sheave 76 on shaft 77 and thence on to the storage drum 17. The spring 83 maintains an upward tension on the brackets 79 and sheave 78 so as to automatically take up any slack in the cable. The level winder brackets are oscillated by the action of the cable as it winds on the storage drum 17 and tension is always present on the cable in the winding brackets. The length of the cable from the point where it enters the initial sheave of the winch and the point where it wraps on the storage drum, changes only minutely during one complete wrap on the drum, thus forcing the cable to wind smoothly on the drum.

To facilitate the control of the cable, it is desirable to have a cable retarding or braking means between the power drums and the storage drum. As shown in FIGURE 1, such a brake means may consist of a block 85 fastened between the two tension brackets 79. A brake shoe 86 is slidably mounted on pins 87 supported by the block 85, the exposed face of said shoe being in line for engagement by the cable C running over the sheave 72. A set screw 88 is adapted to adjust the position of the brake shoe 86 relative to the block 85 to thereby regulate its engagement with the cable C. Thus, the tension applied to the brackets 79 by the spring 83, swings the brackets upwardly and with them the block 85 and brake shoe 86.

In order to support the level winding assembly and stabilize its movement, the preferred form of the invention includes a pair of rollers 89 respectively supported on brackets 90 fixed to the outer faces of the level winding brackets 70 and 71. These brackets rotatably support the rollers 89 in rolling engagement with the underface of a cross plate 91 secured between the lower extremities of the storage drum brackets 15, 16 on the frame members 10 and 11. Thus, as the level winder swings from side to side, the engagement of the rollers 89 with the cross plate 91 provides the necessary support for the level winder.

A fair lead sheave 92 is supported adjacent the entrance groove of power drum 13, on vertical brackets 93 supported on the frame members 10—11 as seen in FIGURE 1 and when the cable is installed in the unit, it enters this fair lead sheave 92 and from there passes down around groove 14a on drum 14, across to groove 13a of drum 13, back to groove 14b of drum 80, thence to groove 13b of drum 13 and so on, until both drums are completely covered with cable. The cable leaves groove 13g of the overrunning sheave 28 and encircles sheaves 72, 78, 73 and 76 from whence it is wound on the drum 17.

Forward input rotation to worm shaft 18 causes the power drums 13 and 14 to rotate in a clockwise direction as viewed in FIGURE 3. The worm shaft also turns the gear 37 and the ring gear 50, the latter revolving in the direction of the arrow in FIGURE 6. Rotation in this direction causes the ring gear 50 to lock with the cam 44 causing the latter to rotate in the same direction. During rotation in this direction, the cam extension 44a is permitted to rotate freely within the overrunning clutch race 67. The rotation of the main cam 44 causes the friction plate assembly 57—58 to revolve, driving the shaft 45 and the sprocket 53 which in turn drives the storage drum sprocket 64 through the sprocket chain 62.

The speed ratio between the worm shaft 18 and the power drums and between the worm shaft and storage drum 17 is such that the storage drum tends to pull the cable faster than it can leave the power drums. This forces the sprocket 53 and the clutch friction discs to rotate slower than the friction elements 58, resulting in a constant slippage of this clutch which causes a constant pull to be exerted on the cable as it leaves the power drums. The pull on the cable causes friction to result between the cable and the power drums and because of this friction, the pull on the cable increases from one groove to the next.

As previously explained, the tread diameters of the initial grooves of each of the power drums are greater than the remaining grooves, the increase in tread diameter of such grooves forcing the cable to stretch and resulting in extremely heavy pulling ability as the cable enters the first groove 13a of drum 13.

In reverse operation, the overrunning clutch 44a—67 in the clutch assembly 41 prevents the cam extension 44a from rotating with ring gear 50 and the ring gear thus is permitted to turn freely on the main portion 44 of the cam. When a pull is applied to the cable as it leaves the fair lead sheave 92 in reverse operations, friction results between the cable and the power drums. As these drums are reversing or turning in counterclockwise direction as viewed in FIGURE 3, the force developed by the friction will pull the cable from the storage drum 17. The rotation of this drum revolves sprocket 53 and clutch plates 57 and the friction between these plates and the friction elements 58, held stationary by cam extension 44a, acts as a brake on the storage drum 17.

When no pull is exerted on the cable as it leaves the fair lead sheave, no friction results between the cable and the drums when the cable is wrapped only 180° around the groove. The cable will spring away from the drum and allow it to turn freely under the cable. When the cable wraps greater than 180° around the groove as is the case with groove 13g; of drum 13, friction and wear would result if the sheave turned under the cable. For this reason, as before pointed out, this groove 13g is separately mounted on the overrunning sheave 28, thereby permitting it to remain stationary when the power drums are reversed.

In connection with the level winding mechanism, it is to be noted that the barrel of the storage drum 17 may be grooved to force the cable to wind evenly on the first layer, after which the oscillation of level winding bracket 70, 71, through the action of the cable, winds the latter evenly on the drum.

From the foregoing, it is believed that the invention may be readily understood by those skilled in the art without further description, it being borne in mind that numerous changes may be made in the details disclosed without departing from the spirit of the invention as set forth in the following claims.

I claim:
1. A cable winch comprising two driven drums, multiple peripheral grooves in the driven drums contoured to closely match the diameter of a cable spanning said driven drums in frictional contact, the initial groove of each of said driven drums being larger in tread diameter than the second groove and the second groove being larger in trend diameter than the remaining grooves, a separate cable storage drum arranged to receive said cable as it is fed from the terminal groove of one of said driven drums, and means for exerting a constant load on said cable as it is pulled from said last-named driven drum, whereby said grooved diameter variations compensate for the stretching of said cable under extreme load conditions.

2. A cable winch comprising first and second driven drum assemblies, respectively keyed to parallel first and second shafts, means for driving said shafts, multiple, peripheral grooves in said drum assemblies contoured to closely match the diameter of a cable spanning said assemblies in frictional contact, a separate cable storage drum arranged to receive said cable as it is fed from the terminal groove of said second drum assembly, said terminal groove being formed in a coaxial, overrunning sheave, independently supported on said second drum assembly shaft, and clutch means operable upon rotation of said second shaft in a cable winding direction, to rotate said sheave with said second drum assembly and in the opposite direction to permit said sheave to remain stationary as the drum assemblies rotate in a reverse direction.

3. In a cable winch having at least one driven drum and a separate storage drum for receiving cable from the latter, drive means for said driven drum, and mechanism for transmitting power from said drive means to said storage drum, the speed ratio between said drive means and said driven drum and between said drive means and said storage drum being such that the latter drum tends to pull the cable faster than it can leave the driven drum, and peripheral means on said driven drum for prestretching the cable wound thereon, to compensate for the stretching of said cable under extreme load conditions.

4. Apparatus as claimed in claim 3, wherein said power transmitting mechanism includes a combined friction clutch and brake assembly operable upon rotation of said drive means in one direction to drive said storage drum and in the opposite direction to apply a braking force to said storage drum, said friction clutch providing a constant slippage and causing a constant pull to be exerted on the cable as it leaves said driven drum, whereby a constant friction is developed between said cable and said driven drum.

5. A cable winch comprising first and second driven drum assemblies, respectively keyed to parallel first and second shafts, means for driving said shafts, multiple, peripheral grooves in said drum assemblies contoured to closely match the diameter of a cable spanning said rum assemblies in frictional contact, said second drum assembly being forwardly offset with respect to said first drum assembly whereby its terminal groove lies forwardly of the corresponding groove of said first drum assembly, a separate cable storage drum arranged to receive said cable as it is fed from the offset terminal groove of said second drum assembly, said terminal groove being formed in a coaxial, overrunning sheave independently supported on said second drum assembly shaft, and clutch means operable upon rotation of said second shaft in a cable winding direction, to rotate said sheave with said second drum assembly and in the opposite direction to permit said sheave to remain stationary as the drum assemblies rotate in a reverse direction.

6. A cable winch as claimed in claim 5, including level winding mechanism for said storage drum.

7. In a cable winch, a pair of driven drums arranged side by side on parallel axes and adapted to frictionally engage a cable wound jointly thereon, a cable storage drum arranged to receive said cable as it is fed from one of said driven drums, the peripheries of each of said driven drums having a series of grooves contoured to closely match the diameter of said cable, the tread diameter of certain successive grooves in respective driven drums being progressively increased toward the entering groove which receives the loaded run of said cable to progressively prestretch the wound cable and compensate for the stretching of said cable under extreme load conditions.

8. Apparatus as claimed in claim 7, wherein the tread diameter of the initial groove of each driven drum, receiving the loaded run of said cable, is greater than that of the immediately succeeding groove and the tread diameter of the latter groove is greater than that of the remaining grooves.

References Cited in the file of this patent

UNITED STATES PATENTS

| | | |
|---|---|---|
| 1,364,579 | Noble | Jan. 4, 1921 |
| 1,396,721 | Atwood | Nov. 15, 1921 |
| 1,575,142 | Wilson et al. | Mar. 2, 1926 |
| 1,661,275 | Stensiand | Mar. 6, 1928 |
| 2,740,594 | Stevens | Apr. 3, 1956 |
| 2,757,884 | Bryant et al. | Aug. 7, 1956 |
| 2,917,278 | Arnold | Dec. 15, 1959 |

OTHER REFERENCES

Roebling Handbook, John A. Roebling's Sons Co., 1947 (p. 52, Fig. 1, of interest).